Patented Aug. 4, 1931

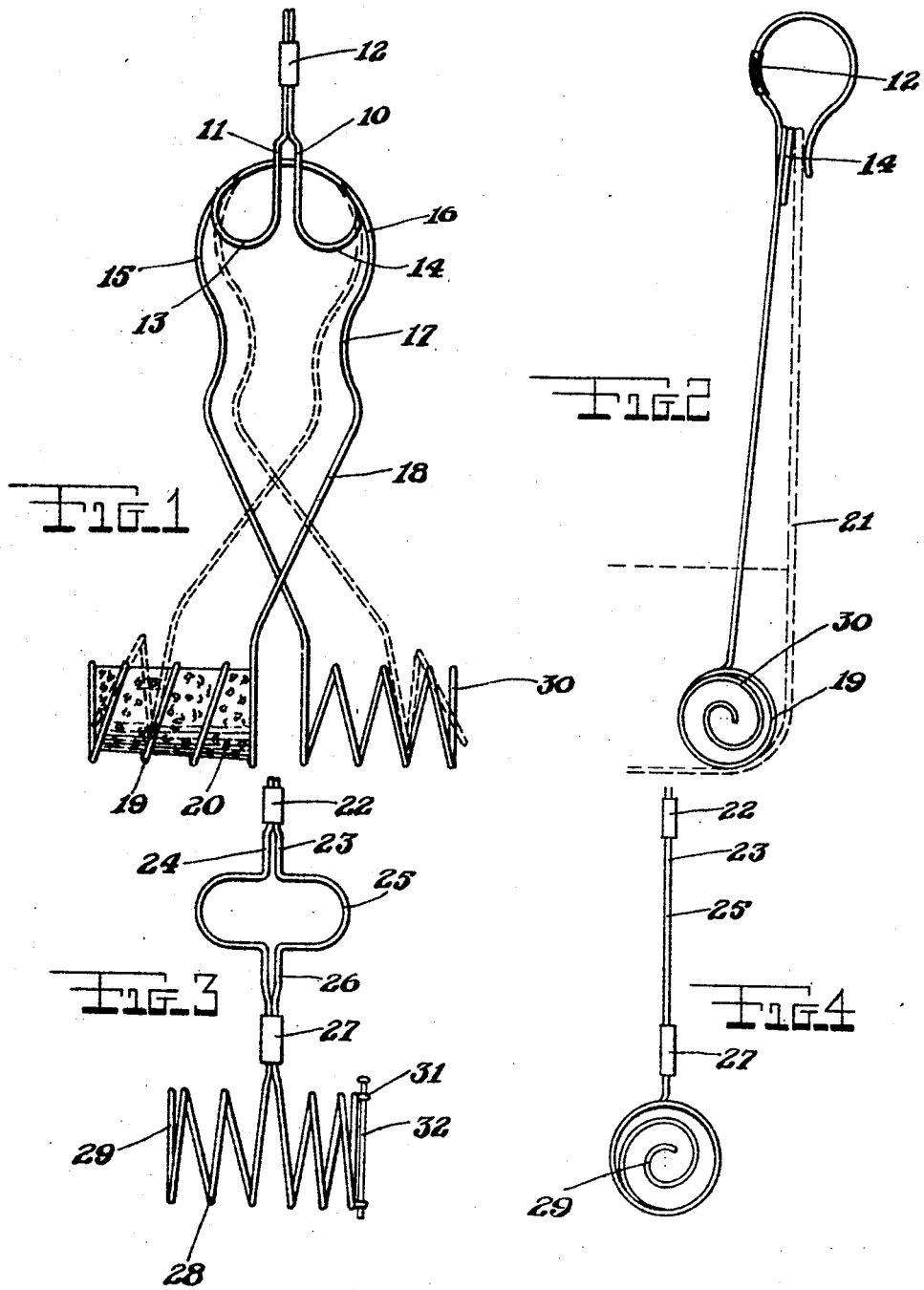

1,816,923

UNITED STATES PATENT OFFICE

HERMANN WEBER, OF PATERSON, NEW JERSEY

CORK STERILIZER CAGE

Application filed May 23, 1929. Serial No. 365,547.

The main object of this invention is to provide a device which will hold a cork, used in obvious manner upon such a container as a thermos bottle, in submerged condition for a period of time so that the cork may be sterilized in a positive manner.

Another object of this invention is to provide an article which may be mounted upon the wall of a pot or similar cooking utensil for the purpose of retaining a cork in submerged condition within the pot or container chamber over a period of time suitable for its sterilization.

The above and other objects will become apparent in the description below, in which characters of reference refer to like-named parts in the drawings.

Referring briefly to the drawings, Figure 1 is a front elevational view of the preferred type of sterilizer cage, showing one of the arms in broken lines in distended position.

Figure 2 is a side elevational view of Figure 1, showing the sterilizer cage as mounted upon the wall of a cooking utensil.

Figure 3 is a front elevational view of a modified form of sterilizer cage.

Figure 4 is an end elevational view of Figure 3.

Referring in detail to the drawings, the numerals 10 and 11 indicate a pair of parallel stems. These stems 10 and 11 at their upper ends are joined and held in coupled position by a sleeve 12 and the portion above the sleeve 12 is formed into a support hook as indicated in Figure 2. The individual extremities of the stems 10 and 11 are formed into reverse loops 13 and 14 which continue downwardly as flexible arms 15 and 16 having intermediate their lengths deformed portions 17 which serve as cradles for the fingers when it is desired to distend or spread apart the extensions 18 which form a part of the arms 15 and 16. These extensions 18 cross each other intermediate their length when the arms 15 and 16 are in a position of rest, as indicated by the full lines in Figure 1. The lower extremities of these extensions 18 are provided with helically wound cages 19 into which corks 20 from thermos bottles or from any other container in which food products are stored are adapted to be inserted.

The ends of the sterilizer cage are closed by a spirally wound wall 30. The portion of the stems 10 and 11 above the sleeve 12 which forms the hook is adapted to be sprung over the wall 21 of a cooking utensil so that the cage is supported within the chamber of the cooking utensil in such manner that the cage is retained in submerged condition therein.

A modified form of sterilizer cage is shown in Figures 3 and 4. This type of cage also uses a hook member 22, a portion of which is shown, from which individual stems 23 and 24 extend downwardly as in the preferred type of sterilizer cage. The stems 23 and 24 are flared outwardly into half-loops 25 and seat upon the surface of the pot or cooking utensil opposite to the surface upon which the hooked end contacts. These half-loops 25 have stems 26 at their opposing ends which are provided with a coupling sleeve 27 and then are again separated below the coupling sleeve 27 to form a helically wound cage 28, as in common with the preferred type of cage, and the cage 28 is then provided with a back 29 spirally wound, as indicated in Figure 4.

Both the preferred and the modified types of cages illustrated on the drawings are adapted to serve the purpose of sterilizing corks for the previously-mentioned articles. The preferred form of sterilizer cage will permit the sterilization of two corks at a time, doubling the efficiency of such an article. To mount the corks in the cages 19 of the preferred type of device, the thumb and forefinger are inserted into the cradle 17 of the flexible arms 15, thus spreading the extensions 18 apart and away from each other so that sufficient space is had between the crossed extensions 18 to permit the insertion of the cork, such as 20, into the cage 19. When insertion has been made the flexible arms 15 and 16 are permitted to resume their normal position shown in full lines in Figure 1 and the entire device is then suspended from the hooked member within a cooking utensil, filled or partly filled with a sterilizing liquid, and permitted to boil for the period of sterilization.

In the modified type of device a single cork may be immersed in the sterilizing liquid by inserting the cork into the cage 28 and suspending the same from the hook portion 22.

Both forms of the sterilizer cages are preferably formed of a single unit of wire in the manner illustrated on the drawings.

A pair of eyelets such as those indicated by the numeral 31 may be formed on the open end rung of the cage 28 in the modified form of device, through which a closure pin 32 is slipped to retain the cork 20 within the cage 28.

It is to be noted that certain changes in form and construction may be made without departing from the spirit and scope of the invention.

I claim:

In a device of the class described, a hook formed of a pair of parallel pieces of joined wires, a pair of stems extending from said hook, loops at the extremity of said stems, flexible arms continuing from said loops, extensions on said arms, sterilizer cages formed at the extremities of said extensions adapted to receive corks therein, said extensions crossing each other at a position along their length, deformed portions on said arms forming cradles for the reception of fingers.

In testimony whereof I affix my signature.

HERMANN WEBER.